(No Model.) 2 Sheets—Sheet 1.
N. B. SMITH & C. P. LUDWIG.
PROCESS OF PRODUCING PAINT PIGMENT FROM ORES.
No. 485,063. Patented Oct. 25, 1892.
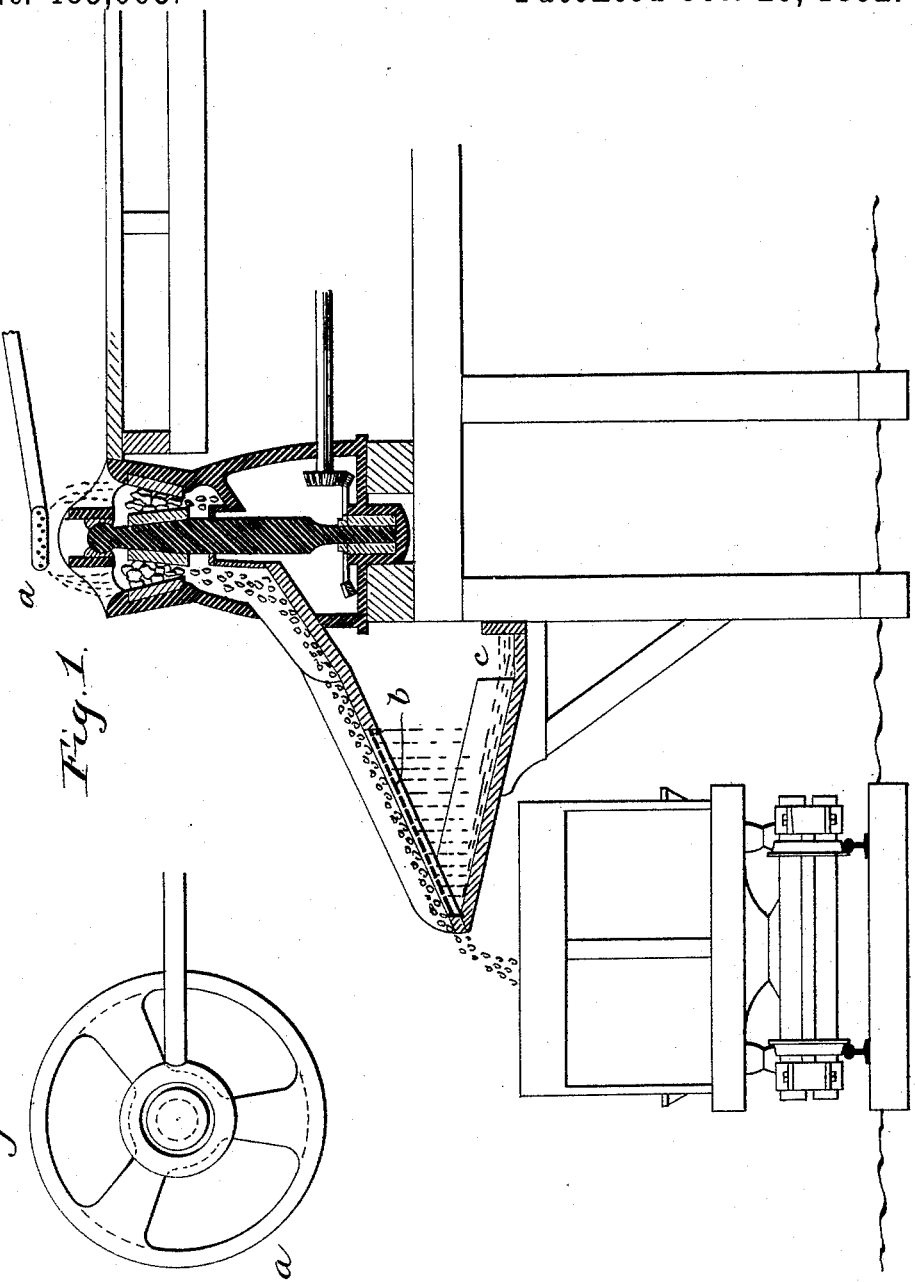

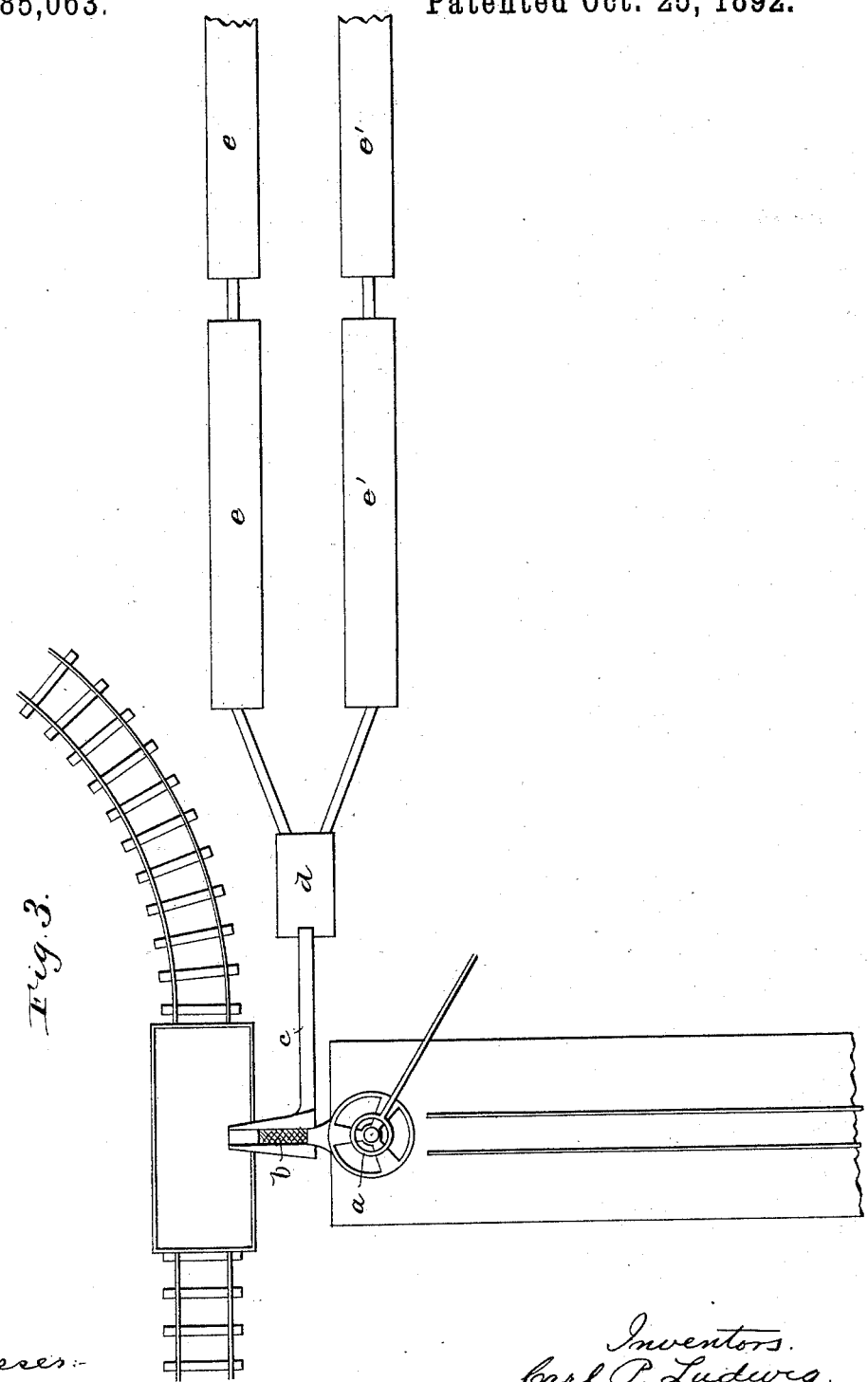

UNITED STATES PATENT OFFICE.

NOAH B. SMITH AND CARL P. LUDWIG, OF BIRMINGHAM, ALABAMA.

PROCESS OF PRODUCING PAINT-PIGMENT FROM ORES.

SPECIFICATION forming part of Letters Patent No. 485,063, dated October 25, 1892.

Application filed August 29, 1891. Serial No. 404,139. (No specimens.)

*To all whom it may concern:*

Be it known that we, NOAH B. SMITH and CARL P. LUGWIG, citizens of the United States, residing at Birmingham, in the county of Jefferson and State of Alabama, have invented certain new and useful Improvements in Process of Producing Paint-Pigment from Ores; and we do declare the following to be a full, clear, and exact description of the invention, such as will enable others skilled in the art to which it appertains to make and use the same, reference being had to the accompanying drawings, and to the letters of reference marked thereon, which form a part of this specification.

As is well known, iron ores are extensively used as paint-pigments in a great variety of of compounds. They are also extensively employed as paint-pigments both in their native condition and after calcination for use on iron and other surfaces which are exposed to the weather, and when properly mixed with a suitable vehicle—such as linseed-oil—they form a protective covering of great resistance and durability. The employment of an iron ore as a paint-pigment requires that said ore shall be reduced to the form and consistency of an impalpable powder or dust. Heretofore this reduction has been accomplished by laborious and expensive processes of grinding and subsequent sifting through sieves. Our process seeks to avoid the expense and the frequent and costly repairs of the heavy machinery implicated in the grinding processes by collecting and properly grading the finely-comminuted ore or dust which is the result of the ordinary methods of working the ore preparatory to smelting. It is often found expedient to break or crush the ore before introducing it into the blast-furnace. This process of breaking or crushing largely increases the percentage of fine material, which is now mostly a waste product lost in the winds or water to which it may be exposed or blown away by the air-blast in the furnace. Every object in the vicinity of the mines is coated with this ore-dust, which is wafted about by the wind. The mine-waters are loaded with the dust in suspension, and carry it away to be lost in the streams. The material thus wasted is in the best possible condition for conversion into paint-pigment; and the object of our invention is to save and utilize it, and this we do in a general way by guarding the several processes of handling the ore to separate out all the fine dust and save the same.

Of course the methods employed by us are to a certain extent known, and we do not broadly claim novelty for them further than their application to the purpose of saving and utilizing a hitherto waste material, and thereby producing a paint-pigment at a much less cost than heretofore, and equal if not superior in quality to that which heretofore has been exclusively produced by costly-grinding processes.

Our process involves a marked economy. It involves the removal of that portion of the ore which is liable to waste and which is not desirable to the smelter and converts it into a commodity having many times the value of the original ore. It also produces a pigment the constituents of which are uncalcined, in which condition we believe it will make a more durable paint than when subjected to a roasting process, such as is often practiced before grinding the ore.

Our invention may be carried into effect in various ways, and we will proceed to describe by way of illustration a few practical procedures involving our improvements, referring to the process as applied to the recovery of pigments from iron ores.

Figure 1 is a vertical section through an ore-crusher in operation, showing the method of applying our process to the separation of the fine ore from the lump ore. Fig. 2 is a plan of the ore-crusher, showing method of applying water to the ore. Fig. 3 is a plan of a crusher-plant, showing method of removing and recovering pigment according to our process.

In separating and recovering the pigment we prefer to spray into the top of the crusher, as at *a*, a small quantity of water, but sufficient to arrest all or nearly all of the fine product. This water, with its sediment, is separated from the ore by the use of screens, as at *b*, or otherwise, and is then conducted through the trough *c* into a tank (which we will call the "grit-tank") *d*, in which the coarser material is deposited, and thence, with the finer sediments, into another tank or series of tanks e, in which the fine paint-pigment is deposited. The water may be permitted to accumulate in these tanks until they are full, when it can be diverted into a second series of tanks e', connected with the grit-tank d or direct with the crusher; or the tank e may be of such length and size as to permit the water to flow continuously through the tank, depositing its sediment in its course. As many independent series of tanks may be employed as desired. When the water in the tanks from which the stream has been diverted has deposited all of its suspended material and become clear, it is siphoned off, when the tanks may again be charged with water from the crusher. When a sufficient amount of sediment has collected in any tank or series of tanks, the water is drawn off and the sediment is removed and dried, preferably by the aid of a gentle heat. When thoroughly dry, the pigment will be found to be slightly caked, and we disintegrate it readily by the use of rolls and fine screens or by other suitable means, the particles being held only loosely together. The material is then ready for shipment as dry pigment, or may be mixed with oil and shipped as ready-mixed paint. This is our process as we prefer to apply it to ore-crushers.

If the ore is not specially prepared for the furnace, our process may be applied by directing a spray of water upon the car of ore as it stands at the loading-tipple. The water in its course through the load of ore will take up and carry with it all or nearly all of the finely-pulverized material, which then may be caught in a suitably-arranged sink and conducted to the settling-tanks in the same manner as that from the crusher.

The waters from an iron-ore mine usually carry in suspension a considerable amount of finely-pulverized ore. Our process may be applied to the recovery of this suspended material by simply directing it through the settling-tanks already described.

We have now described the manner in which we prefer to apply our process.

Having thus described our invention, what we claim is—

1. The herein-described mode of recovering ore dust and preparing it for paint-pigment, which consists in separating the dust produced in the ordinary methods, of partly crushing and preparing the ore for the smelting-furnace by streams of water, and subsequently settling and recovering said dust in a dried condition, substantially as set forth.

2. The herein-described method of preparing ore for smelting and recovering paint-pigments, which consists in breaking or partly crushing the ore, subjecting the ore to the action of streams of water, and thereby collecting the dust produced by such breaking, and separating the impalpable or fine portion of such dust, substantially as set forth.

3. The herein-described method of preparing ore and recovering paint-pigments, which consists in breaking or partly crushing the ore, arresting the dust thereby produced by a spray or stream of water, causing the deposit or settlement of the suspended material from the water in different grades, substantially as set forth.

4. The herein-described method of preparing ore and recovering paint-pigments, which consists in breaking or partly crushing the ore, arresting the dust thereby produced by a spray, causing the deposit from the liquid of the suspended material, drying the latter, disintegrating or pulverizing the dried material, and mixing the latter with oil, substantially as set forth.

In testimony whereof we affix our signatures in presence of two witnesses.

NOAH B. SMITH.
CARL P. LUDWIG.

Witnesses:
MAJOR WAITS,
L. G. PETTYJOHN.